United States Patent
Kobayashi

(10) Patent No.: US 7,305,382 B2
(45) Date of Patent: Dec. 4, 2007

(54) INFORMATION SEARCHING APPARATUS AND METHOD, INFORMATION SEARCHING PROGRAM, AND STORAGE MEDIUM STORING THE INFORMATION SEARCHING PROGRAM

(75) Inventor: Yuji Kobayashi, Kanagawa (JP)

(73) Assignee: Canon Kabushiki Kaisha (JP)

( * ) Notice: Subject to any disclaimer, the term of this patent is extended or adjusted under 35 U.S.C. 154(b) by 537 days.

(21) Appl. No.: 10/762,126

(22) Filed: Jan. 21, 2004

(65) Prior Publication Data

US 2004/0220919 A1 Nov. 4, 2004

(30) Foreign Application Priority Data

Jan. 22, 2003 (JP) ............................ 2003-013428

(51) Int. Cl.
*G06F 17/30* (2006.01)
(52) U.S. Cl. ............................ 707/3; 707/6; 707/104.1
(58) Field of Classification Search ............... 707/1–3, 707/6, 100, 104.1; 382/155, 209
See application file for complete search history.

(56) References Cited

U.S. PATENT DOCUMENTS

| | | | | |
|---|---|---|---|---|
| 4,944,022 | A * | 7/1990 | Yasujima et al. | 382/155 |
| 6,820,075 | B2 * | 11/2004 | Shanahan et al. | 707/3 |
| 7,010,519 | B2 * | 3/2006 | Tada et al. | 707/3 |
| 2003/0063326 | A1 * | 4/2003 | Kiyono et al. | 358/440 |
| 2005/0216443 | A1 * | 9/2005 | Morton et al. | 707/3 |

FOREIGN PATENT DOCUMENTS

JP 2586372 12/1996

OTHER PUBLICATIONS

Yukata et al., "Highly accurate retrieval of Japaneese document images through a combination of morphological analysis and OCR", 2002, Proceedings of SPIE vol. 4670, p. 57-67.*
Jeffrey Black et al., "Automated Document Analysis System", 2002,Proceedings of SPIE vol. 4708, p. 90-98.*
James Peterson, "Computer Programs for Detecting and Correcting Spelling Errors", Dec. 1980, communications of the ACM, vol. 23, No. 12, pp. 676-687.*

* cited by examiner

*Primary Examiner*—Cam Linh Nguyen
(74) *Attorney, Agent, or Firm*—Rossi, Kimms & McDowell LLP

(57) ABSTRACT

There is provided an information searching apparatus that can carry out proper searches with few missed search hits and few erroneous search hits. A word extracted from a document is registered in association with the document as index information for document search. A document corresponding to information relating to a requested search is searched by referring to the registered index information. An unknown word is extracted from the document being searched. A type of the document being searched is determined. It is determined whether the index information registering device is permitted or inhibited to register the unknown word extracted as the index information, according to the determined type of the document determined.

8 Claims, 10 Drawing Sheets

| ヵカカ刀 |
|---|
| ーーー |
| ロロ |
| ヘヘ |
| エエ |
| ニニ |
| ……… |

INFORMATION SEARCHING APPARATUS AND METHOD, INFORMATION SEARCHING PROGRAM, AND STORAGE MEDIUM STORING THE INFORMATION SEARCHING PROGRAM

BACKGROUND OF THE INVENTION

1. Field of the Invention

The present invention relates to an information searching apparatus and method, an information searching program, and a storage medium storing the information searching program, and in particular to an information searching apparatus and method and an information searching program that search for a desired document among documents including multimedia information such as characters and images, and a storage medium storing the information searching program.

2. Description of the Related Art

Conventionally, there is known an information searching apparatus that uses a method called full-text search for searching for a desired document among a plurality of documents including multimedia information. In this apparatus, a desired search keyword or phrase, for example, is inputted as search information and documents including words or phrases that match the inputted search keyword or phrase are obtained from a stored group of documents.

To enable searches for information based on the contents of documents including document images, an apparatus constructed to perform character recognition on character image portions included in the document images and perform the full-text search based on character information obtained as a result of the character recognition has also been proposed.

However, there is the possibility that a document including character codes obtained as the result of character recognition (hereinafter referred to as a "character recognition processed document") includes misrecognized characters, so that in the case where a full-text search is performed using the same method as for a text that has not been subjected to the character recognition, there can be erroneous search hits where there is a match for characters that differ to those in the original document and an increase in the number of missed search hits.

For this reason, before a full-text search is carried out for a character recognition processed document, it is customary for a user to go through the character recognition processed document being searched, for misrecognized portions and correct the misrecognized portions one by one.

To dispense with such visual corrections, a method has been disclosed that selects, using a plurality of characters that are candidates for character recognition together with assumed values indicative of probability thereof, a plurality of candidate characters, and therefore reduces the number of missed search hits even for a character recognition processed document including erroneously recognized characters (Japanese Patent No. 2586372). That is, by carrying out a search including a plurality of character recognition candidate characters, it is possible to reduce the number of missed search hits.

However, there is the risk of a decrease in search accuracy, for example, in a case where a character string that should be recognized as "モノレール" ("monorail") has been misrecognized as "モルール" as shown in FIG. 5, if a search is carried out for the character string "ルール", the misrecognized character string "モルール" matches and is therefore given as an erroneous search hit.

Also, in the case of a character recognition processed document comprised of only character codes obtained by character recognition, even if the above method is used, since information on other candidate characters is required during the character recognition process, so that favorable results cannot be expected and the problems of erroneous search hits and an increased number of missed searched hits remain.

On the other hand, an information searching apparatus using a word index has also been proposed. Such apparatus carries out morpheme analysis that looks not just at index information in character units but also collates or compares the characters with words that actually exist and registers extracted words as index information for document searching purposes. Compared to the information searching apparatus that searches in character units, this information searching apparatus that carries out a word search can avoid matches that extend over boundaries between words and the like, making it possible to improve the search accuracy. However, since in actuality it is not possible to record every word in a word dictionary, information searches carried out using such word index are not able to search for words not present in the dictionary and there can be missed search hits.

SUMMARY OF THE INVENTION

It is a first object of the present invention to provide an information searching apparatus and method, and an information searching program, that can carry out proper searches with few missed search hits and few erroneous search hits, as well as and a storage medium storing the information searching program.

It is a second object of the present invention to provide an information searching apparatus and method, and an information searching program that can improve search accuracy, as well as and a storage medium storing the information searching program.

To attain the above objects, in a first aspect of the present invention, there is provided an information searching apparatus comprising an index information registering device that registers a word extracted from a document in association with the document as index information for document search, a document searching device that searches a document corresponding to information relating to a requested search by referring to the index information registered by the index information registering device, an unknown word extracting device that extracts an unknown word from the document being searched, a document type determining device that determines a type of the document being searched, and a registration permitting/inhibiting determining device that determines whether the index information registering device is permitted or inhibited to register the unknown word extracted by the unknown word extracting device as the index information, according to the type of the document determined by the document type determining device.

According to the above construction, it is possible to carry out appropriate searches with few missed search hits and few erroneous search hits by determining whether registration of unknown words in an index is permitted or inhibited according to the type of document.

Preferably, the document type determining device determines whether the document being searched is a character recognition processed document including character codes obtained by a character recognition process, and the registration permitting/inhibiting determining device is operable when the document being searched is the character recognition processed document, to inhibit the index information registering device from registering as the index information the unknown word extracted from the document being searched by the unknown word extracting device.

Preferably, the document type determining device determines whether the document being searched is a character recognition processed document including character codes obtained by a character recognition process, the information searching apparatus further comprises a permitting/inhibiting designating device operable when the document being searched is the character recognition processed document, to designate whether the index information registering device is permitted or inhibited to register as the index information the unknown word extracted by the unknown word extracting device from the document being searched, and the registration permitting/inhibiting designating device is operable when the document being searched is the character recognition processed document, to determine whether the index information registering device is permitted or inhibited to register as the index information the unknown word extracted by the unknown word extracting device, based on the designation by the permitting/inhibiting designating device.

Preferably, the document type determining device determines whether the document being searched is a character recognition processed document including character codes obtained by a character recognition process, and the registration permitting/inhibiting determining device is operable when the document being searched is not the character recognition processed document, to permit the index information registering device to register as the index information the unknown word extracted from the document being searched by the unknown word extracting device.

Preferably, the document type determining device determines whether the document being searched is a character recognition processed document including character codes obtained by a character recognition process, the information searching apparatus further comprises a character correcting device operable when the document being searched is the character recognition processed document, to correct an error in the character codes included in the document being searched, and the unknown word extracting device extracts the unknown word from the document having the error corrected by the character correcting device.

Preferably, the document type determining device determines whether the document being searched is an image document, the information searching apparatus further comprises a character recognition processing device operable when the document being searched is an image document, to obtain character codes from the image document by performing a character recognition process, and a character correcting device that corrects an error in the character codes included in the document subjected to the character recognition process by the character recognition processing device, and the unknown word extracting device extracts the unknown word from the document being searched after correction of the document by the character correcting device.

More preferably, the character correcting device refers to a character correction dictionary, in which characters having similar character patterns are stored in association with each other, and a word dictionary for comparing character strings, and corrects the error by changing an associated character code included in the character recognition processed document to a character composing a character candidate string, out of character candidate strings produced by adding at least one character pattern in the character correction dictionary to at least one character code included in the character recognition processed document, and matching a word included in the word dictionary.

Preferably, the document type determining device determines the type of the document being searched, based on at least one of a filename extension of the document being searched and attribute information added in advance to the document being searched.

To attain the above objects, in a second aspect of the present invention, there is provided an information searching apparatus comprising a word extracting device that extracts a word from a document, an index information registering device that registers the word extracted from the document in association with the document as index information for document search, a document search device that searches a document corresponding to information relating to a requested search by referring to the index information registered by the index information registering device, and a character correcting device that corrects an error in the character codes included in a document subjected to a character recognition process, the word extracting device extracts the word from the document having the error corrected by the character correcting device.

According to the above construction, it is possible to improve the search accuracy by extracting words after error correction has been carried out.

Preferably, the character correction device refers to a character correction dictionary, in which characters having similar character patterns are stored in association with each other, and a word dictionary for comparing character strings, and corrects the error by changing an associated character code included in the character recognition processed document to a character composing a character candidate string, out of character candidate strings produced by adding at least one character pattern in the character correction dictionary to at least one character code included in the character recognition processed document, and matching a word included in the word dictionary.

To attain the above objects, in a third aspect of the present invention, there is provided an information searching method comprising an index information registering step of registering a word extracted from a document in association with the document as index information for document search, a document search step of searching a document corresponding to information relating to a requested search by referring to the index information registered in the index information registering step, an unknown word extracting step of extracting an unknown word from the document being searched, a document type determining step of determining a type of the document being searched, and a registration permitting/inhibiting determining step of determining whether the index information registering step is permitted or inhibited to register the unknown word extracted in the unknown word extracting step as the index information, according to the type of the document determined in the document type determining step.

To attain the above objects, in a fourth aspect of the present invention, there is provided an information searching method comprising, a word extracting step of extracting a word from a document, an index information registering step of registering the word extracted from the document in association with the document as index information for document search, a document search step of searching a document corresponding to information relating to a requested search by referring to the index information registered in the index information registering step, and a character correcting step of correcting an error in the character codes included in a document subjected to a character recognition process, the word extracting step comprises extracting the word from the document having the error corrected in the character correcting step.

To attain the above objects, in a fifth aspect of the present invention, there is provided a computer-executable information searching program comprising an index information registering module for registering a word extracted from a document in association with the document as index information for document search, a document search module for searching a document corresponding to information relating to a requested search by referring to the index information registered by the index information registering module, an unknown word extracting module for extracting an unknown word from the document being searched, a document type determining module for determining a type of the document being searched, and a registration permitting/inhibiting determining module for determining whether the index information registering module is permitted or inhibited to register the unknown word extracted by the unknown word extracting module as the index information, according to the type of the document determined by the document type determining module.

To attain the above objects, in a sixth aspect of the present invention, there is provided a computer-executable information searching program comprising a word extracting module for extracting a word from a document, an index information registering module for registering the word extracted from the document in association with the document as index information for document search, a document search module for searching a document corresponding to information relating to a requested search by referring to the index information registered by the index information registering module, and a character correcting module for correcting an error in the character codes included in a document subjected to a character recognition process, the word extracting module comprises extracting the word from the document having the error corrected by the character correcting module.

To attain the above objects, in a seventh aspect of the present invention, there is provided a computer-readable storage medium storing an information searching program comprising an index information registering module for registering a word extracted from a document in association with the document as index information for document search, a document search module for searching a document corresponding to information relating to a requested search by referring to the index information registered by the index information registering module, an unknown word extracting module for extracting an unknown word from the document being searched, a document type determining module for determining a type of the document being searched, and a registration permitting/inhibiting determining module for determining whether the index information registering module is permitted or inhibited to register the unknown word extracted by the unknown word extracting module as the index information, according to the type of the document determined by the document type determining module.

To attain the above objects, in an eighth aspect of the present invention, there is provided a computer-readable storage medium storing an information searching program comprising a word extracting module for extracting a word from a document, an index information registering module for registering the word extracted from the document in association with the document as index information for document search, a document search module for searching a document corresponding to information relating to a requested search by referring to the index information registered by the index information registering module, and a character correcting module for correcting an error in the character codes included in a document subjected to a character recognition process, the word extracting module comprises extracting the word from the document having the error corrected by the character correcting module.

The above and other objects, features, and advantages of the invention will become more apparent from the following detailed description taken in conjunction with the accompanying drawings.

BRIEF DESCRIPTION OF THE DRAWINGS

FIG. 5 is a view showing an extracted text obtained as a result of a character recognition process performed on an image representing characters;

FIG. 6 is a view showing a result when a character correction process has been performed on an extracted text including a character recognition error illustrated in FIG. 5;

FIG. 7 is a schematic diagram showing a structure of a character correction dictionary;

DESCRIPTION OF THE PREFERRED EMBODIMENTS

The present invention will now be described in detail with reference to the accompanying drawings showing preferred embodiments thereof.

Figure 1:
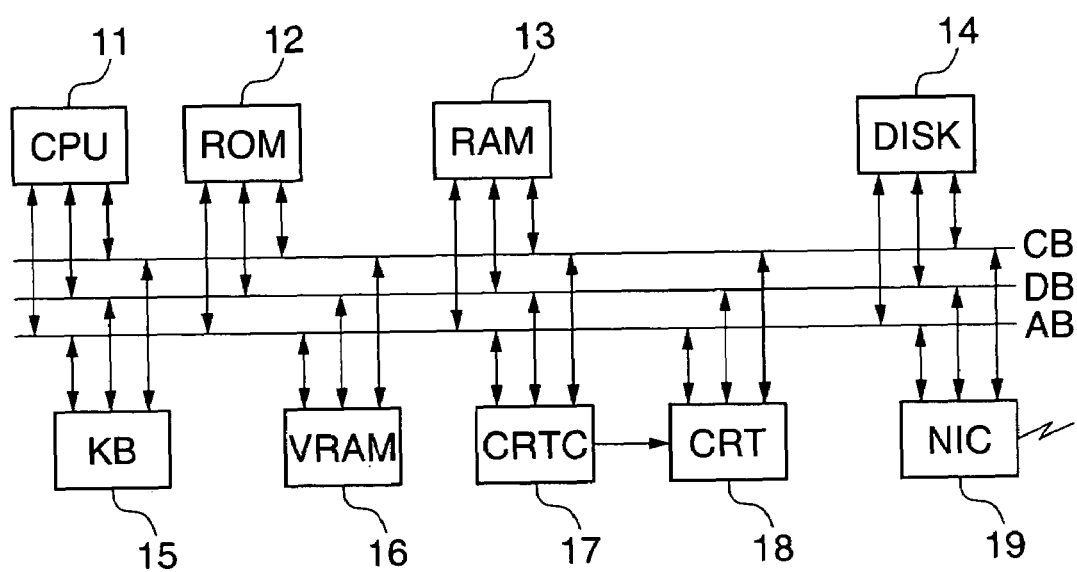
FIG. 1 is a block diagram showing the entire construction of an information searching apparatus according to an embodiment of the present invention.

FIG. 1 is a block diagram showing the entire construction of an information searching apparatus according to an embodiment of the present invention.

In FIG. 1, reference numeral 11 designates a microprocessor (CPU) that carries out operations for information searches, logical determinations, and the like, and controls, via an address bus AB, a control bus CB, and a data bus DB, component elements of the information searching apparatus that are connected to these buses.

The address bus AB transfers an address signal for indicating a component element to be controlled by the CPU 11. The control bus CB transfers control signals to respective component elements controlled by the CPU 11. The data bus DB transfers data between the component elements.

Reference numeral 12 designates a read-only memory (ROM), which stores control program codes, such as a processing program, to be executed by the present embodiment. Reference numeral 13 designates a rewritable random access memory (RAM) that temporarily stores various data from the component elements. To store predetermined data in the RAM 13, described later with reference to FIG. 2, the information searching apparatus is provided with a search keyword storing section 202, a search result storing section 204, an unknown word search designating/storing section 208, and a document type storing section 214.

Reference numeral 14 designates an external memory (DISK), and stores a word index 205, a word extraction dictionary (word dictionary) 207, a character correction dictionary 210, an extracted text 212, and data of registered documents inputted to a document registration processing section 215, all of which will be described later with reference to FIG. 2. Further, the disk 14 stores program codes that are executed by respective processing sections of a search request input processing section 201, a search processing section 203, a word extraction processing section 206, a character correction processing section 209, a character recognition processing section 211, and a registered document type determining section 213, all of which will be described later with reference to FIG. 2. The disk 14 which thus stores these data and program codes is implemented by a storage medium such as a hard magnetic disk, a ROM, a floppy (registered trademark) disk, a CD-ROM, a CD-R, a CD-RW, a DVD-ROM, a DVD-RAM, a DVD-R, a memory card, a magneto-optical disk, or a magnetic tape.

Reference numeral 15 designates a keyboard (KB) comprised of alphabet keys, hiragana keys, katakana keys, character code input keys for periods and the like, a search key for instructing a search, and various function keys, such as cursor movement keys for instructing cursor movement. Reference numeral 16 designates a display video memory (VRAM), in which display patterns of data to be displayed are stored. Reference numeral 17 designates a CRT controller (CRTC) that displays the display patterns of the data to be displayed which have been stored in the VRAM 16 on a CRT 18.

The CRT 18 is a display device such as a cathode ray tube or a liquid crystal panel. The display of display patterns in dot format and a cursor on the display apparatus 18 is controlled by the CRT controller 17. Reference numeral 19 designates a network controller (NIC) that connects to a network, such as an Ethernet (registered trademark).

The information searching apparatus comprised of these component elements operates in accordance with inputs of various information from the keyboard 15 and various information supplied from the network controller 19 via a network. When predetermined information has been inputted from the keyboard 15 or the network controller 19, first an interrupt signal is sent to the CPU 11, and the CPU 11 reads various control signals that are stored in the DISK 14, and carries out various control operations according to the control signals.

Figure 2:
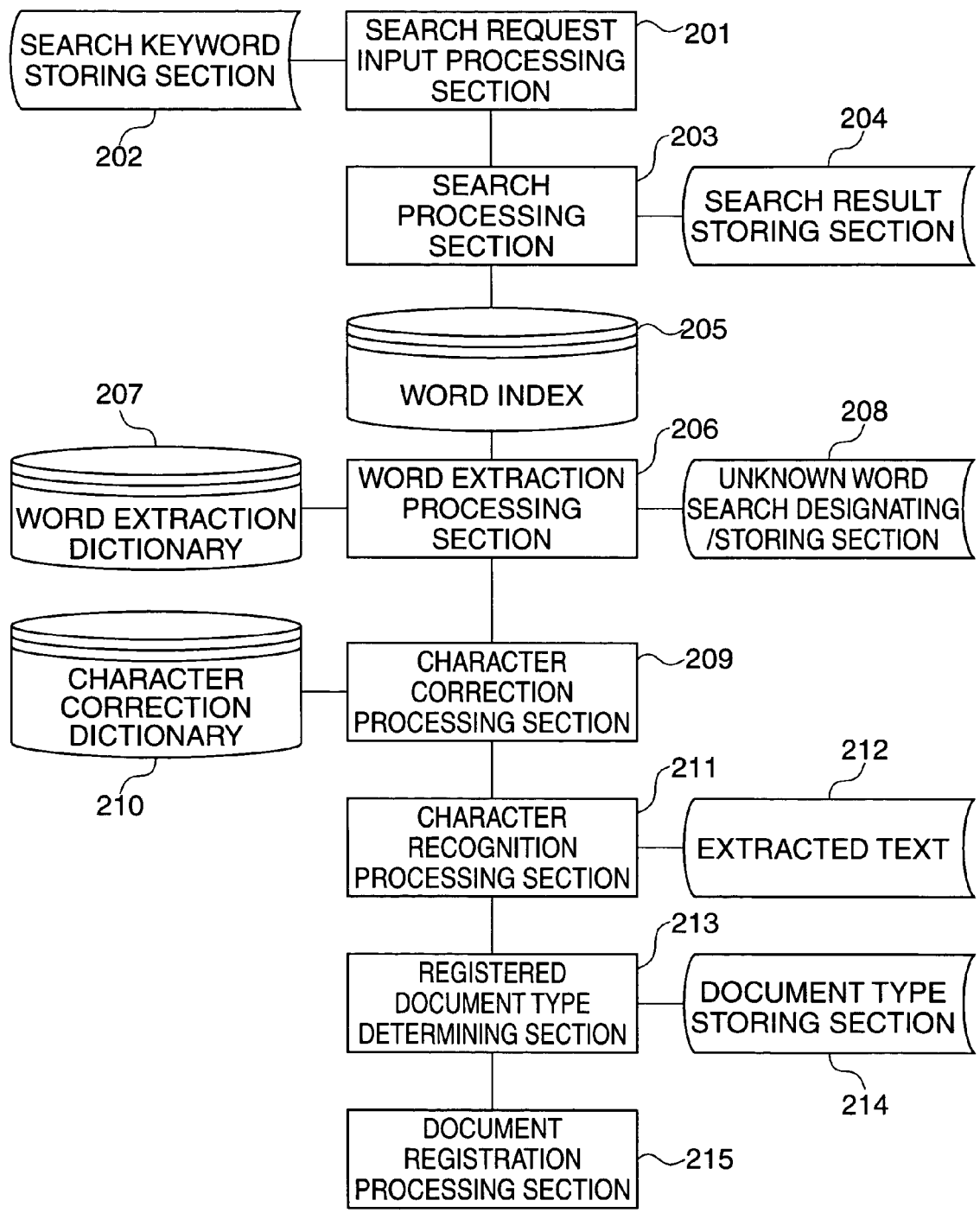
FIG. 2 is a block diagram showing the arrangement of functions in the information searching apparatus of FIG. 1.

FIG. 2 is a block diagram showing the arrangement of functions of the information searching apparatus according to the present embodiment.

In FIG. 2, the search request input processing section 201 inputs a request item relating to a desired search item. The request item is search information such as a search phrase or search keyword, and in the present embodiment, is used as search keywords. The search keyword storing section 202 stores the keywords inputted by the search request input processing section 201. The search processing section 203 carries out a search of registered documents based on the search keywords stored in the search keyword storing section 202. The search result storing section 204 stores a processing result of the search processing section 203.

The word index 205 stores words extracted from the documents registered in the document registration processing section 215 in association with document information of the documents in which the respective words appear. The word extraction processing section 206 extracts words (words that are to be compared with the keywords) for which searches are to be performed, from the documents registered in the document registration processing section 215. The word extraction dictionary 207 defines words that are referred to by the word extraction processing section 206.

The unknown word search designating/storing section 208 designates whether or not words, out of the words appearing in the documents registered in the document registration processing section 215, that have been determined to be "unknown words" not defined in the word extraction dictionary 207 are to be registered in the word index 205 as index information for document searching purposes. When registering a text document resulting from a character recognition process (that is, a document including character codes obtained as a result of character recognition, which will be hereinafter called a "character recognition processed document") in the document registration processing section 215, the unknown word search designating/storing section 208 stores results of a designation carried out in accordance with user wishes, that the unknown words not registered in the word extraction dictionary 207 are to be registered to allow searching (i.e. an index is to be generated) or that registration of the unknown words is inhibited to prevent searches for the unknown words. That is, the unknown word search designating/storing section 208 stores a result of the designation as to whether the registration of unknown words extracted from a character recognition processed document as index information is permitted or inhibited.

The character recognition processing section 211 converts, when a document registered in the document registration processing section 215 is an image document, image information of the image document into character information by carrying out a character recognition process. The extracted text 212 stores recognized characters (character codes composing the character recognition processed document) that are a processing result of the character recognition processing section 211. The character correction processing section 209 corrects character recognition errors in the extracted text 212 composed of recognized characters obtained from the image document by referring to the character correction dictionary 210 and the word extraction dictionary 207.

The registered document type determining section 213 determines respective document types of the documents registered in the document registration processing section 215 (i.e., whether the respective documents are image documents, extracted texts storing character recognition results, or normal texts). If an extension of a filename of a registered document signifies an image format such as "bmp", "jpg", "gif", or "tif", the registered document type determining section 213 stores an indication showing that the registered document is an "image type" in the document type storing section 214. If the extension of the filename of the registered document signifies text such as "txt", the registered document type determining section 213 stores an indication showing that the registered document is a "text type" in the document type storing section 214. Here, out of the text documents, "ocr" is used as a special extension for an extracted text obtained as a result of character recognition processing. If the extension of the filename is "ocr", the registered document type determining section 213 stores an indication showing that the registered document is a "recognition result text type" in the document type storing section 214. The document registration processing section 215 carries out the registration of documents.

Next, an example of display of an operation panel in the search request input processing section 201 when an operator indicates a search keyword for a search request for searching documents will be described with reference to FIG. 3.

Figure 3:
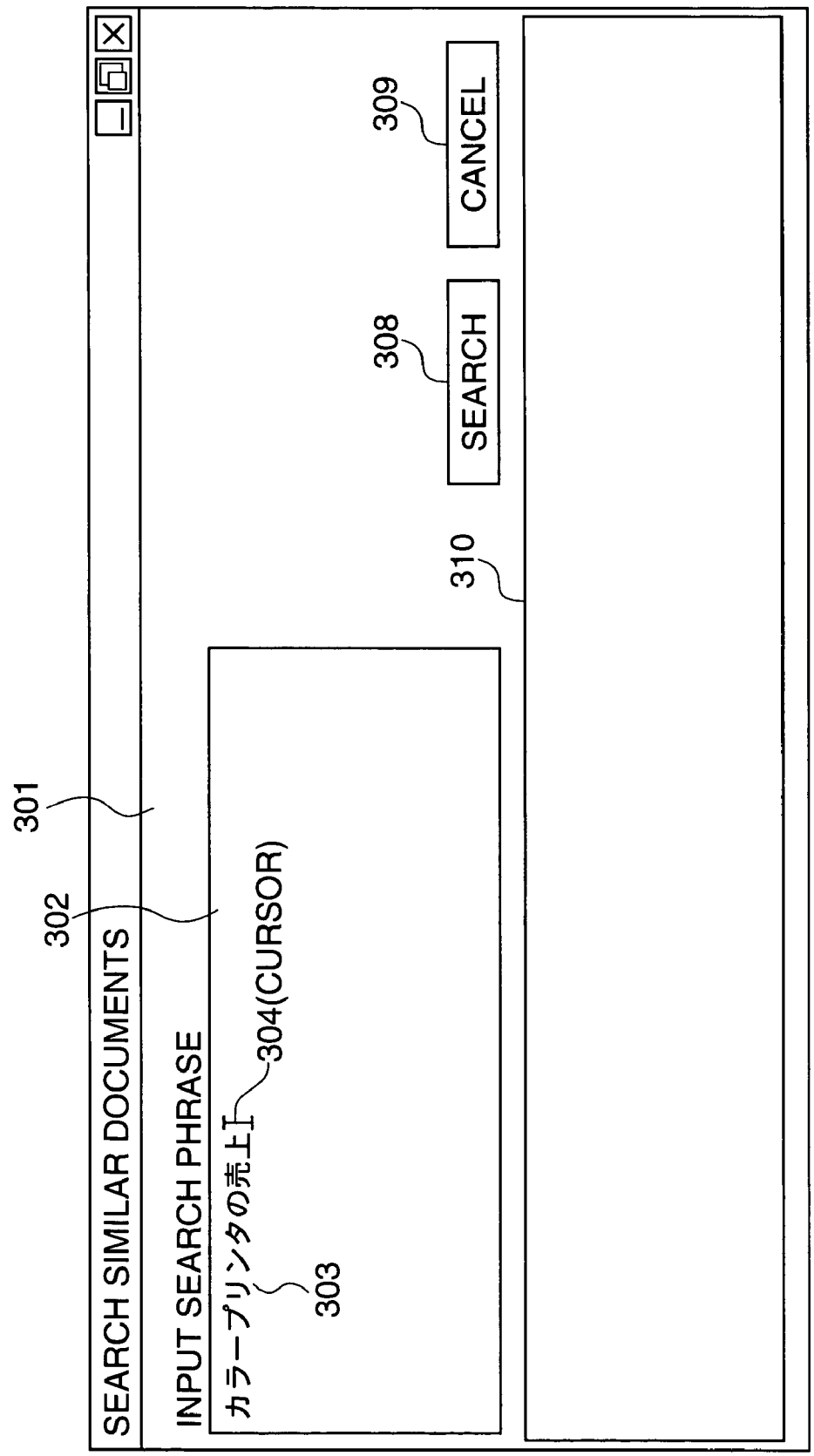
FIG. 3 is a view showing one example of an operation panel displayed on a screen of a CRT when a search keyword is indicated.

FIG. 3 is a view showing an example of an operation panel displayed as a screen on the CRT 18 when a search keyword is indicated.

In FIG. 3, reference numeral 301 designates a display window for carrying out a search request input operation. Reference numeral 302 designates a search phrase input region for inputting search information, such as a search keyword. Reference numeral 303 represents one example of search information (a search request phrase) being inputted, with the "カラープリンタの売上げ" ("the sales of color printers") being inputted in FIG. 3. Reference numeral 304 designates an input cursor showing an input position in the search phrase input region 302.

Reference numeral 308 designates a search execution button that designates the execution of a search process. When the search execution button 308 is pressed, the designated search process is executed. Reference numeral 309 designates a cancel button that designates termination or canceling of the search process. When the cancel button 309 is pressed, the search process is immediately terminated, the display window 301 is closed and the processing is completed. Reference numeral 310 designates a search result display region that displays a result of the search process executed when the search execution button 308 is pressed. FIG. 3 shows the state where the search process is yet to be performed, and therefore nothing is displayed in the search result display region 310.

Figure 4:
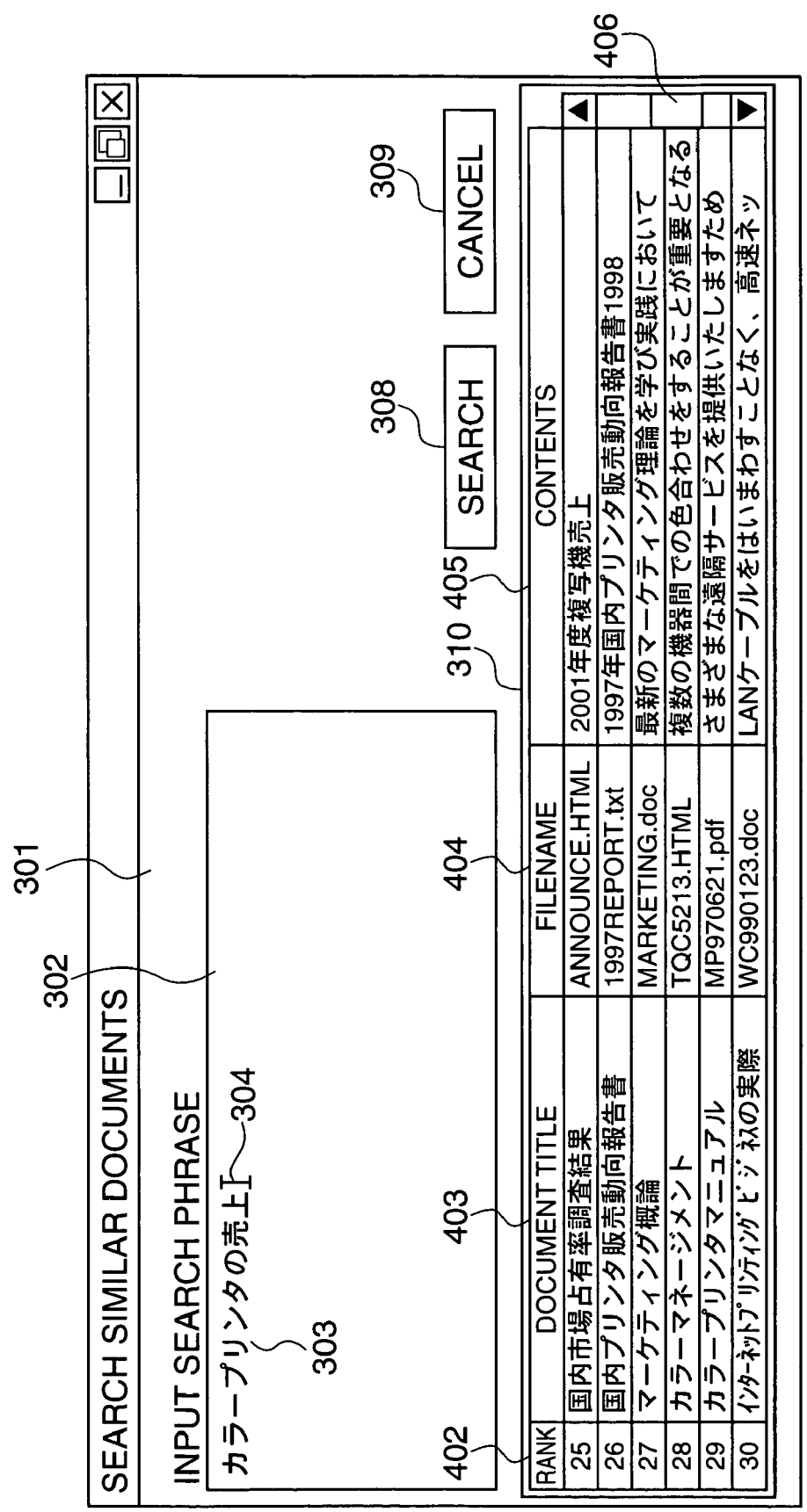
FIG. 4 is a view showing an example of display of search results after execution of a search process by a search request input processing section.

FIG. 4 is a view showing an example of display of search results after the search process has been carried out by the search request input processing section 201. In FIG. 4, search results are displayed for a document search carried out for "カラープリンタの売上げ" ("The sales of color printers") shown in the search information 303.

In FIG. 4, reference numeral 402 designates a rank display region showing the order of the search results. The search results are ranked in order of compatibility with the search request and are displayed in order of rank. In the illustrated example shown in FIG. 4, the search results ranked from 25th to 30th are displayed. Reference numeral 403 designates a title region showing titles of documents that have been found. Reference numeral 404 designates a filename region showing filenames of the documents. Reference numeral 405 designates a document contents display region displaying excerpts that enable the user to grasp the respective gist of the documents that have been found. A summary provided in advance as bibliographical attributes of a document, a summary automatically generated for the contents of a document, or a synopsis or the like extracted as the gist of part of a document can be displayed in the document contents display region 405.

Reference numeral 406 designates an elevator bar that is used by the same type of window display apparatus to designate the display position. When all search results cannot be displayed in the search result display region 310, one part of the search results are displayed in the search result display region 310 and this elevator bar 406 is used to display other parts that are not currently on display.

Next, the extracted text 212 that is the recognition result of the character recognition process will be described with reference to FIG. 5.

FIG. 5 is a view showing an example of the extracted text obtained as a result of the character recognition process performed on an image representing characters. Here, there are cases where the extracted text is extracted by the character recognition processing section 211 and cases where a character recognition process has been performed in advance to register the resulting extracted text in the document registration processing section 215.

In a character recognition process in general, recognition errors can occur. For example, as shown in FIG. 5, the fourth character "ロ" of "モノクロ" should be the katakana character "ロ", but is misrecognized as the kanji character "口", and a part of the original image subjected to the character recognition process where "モノレール" is written is misrecognized as "モルール".

Next, an example of the processing result of a character correction process performed on an extracted text resulting from character recognition will be described using FIG. 6.

FIG. 6 is a view showing a result of the character correction process performed on an extracted text including the character recognition errors illustrated in FIG. 5. By referring to the character correction dictionary 210 and the word extraction dictionary 207, described later, the character correction processing section 209 has corrected the misrecognized "モノク口" (with the kanji character "口") in FIG. 5 to "モノクロ" (with the katakana character "ロ").

FIG. 7 is a schematic diagram showing the structure of the character correction dictionary 210. The character correction dictionary 210 stores characters with similar character shapes, which are easily misrecognized in the character recognition process, in association with one another. In FIG. 7, sets of characters that are easily misrecognized for one another appear on different lines.

Figure 8:
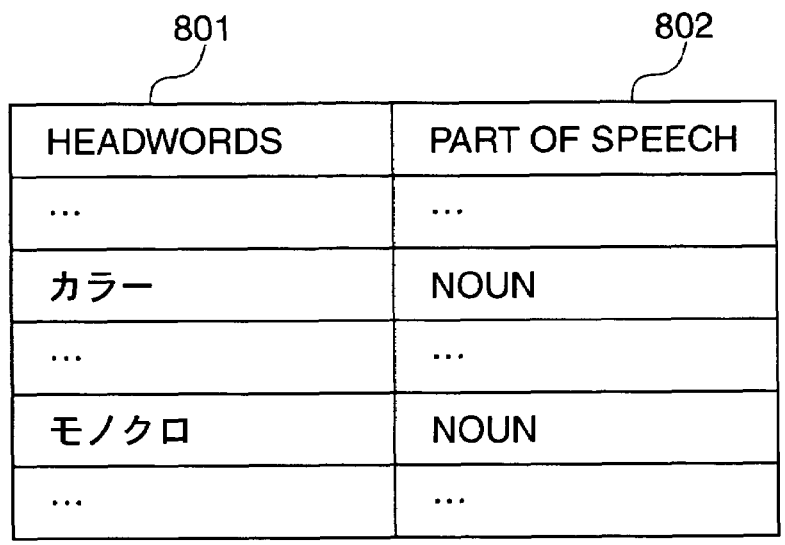
FIG. 8 is a schematic diagram showing a structure of the word extraction dictionary.

FIG. 8 is a schematic diagram showing the structure of the word extraction dictionary 207. In FIG. 8, reference numeral 801 designates headwords for words, and 802 designates the parts of speech of words. The parts of speech 802 are used to determine the connectability of an extracted word and a preceding word.

Figure 9:
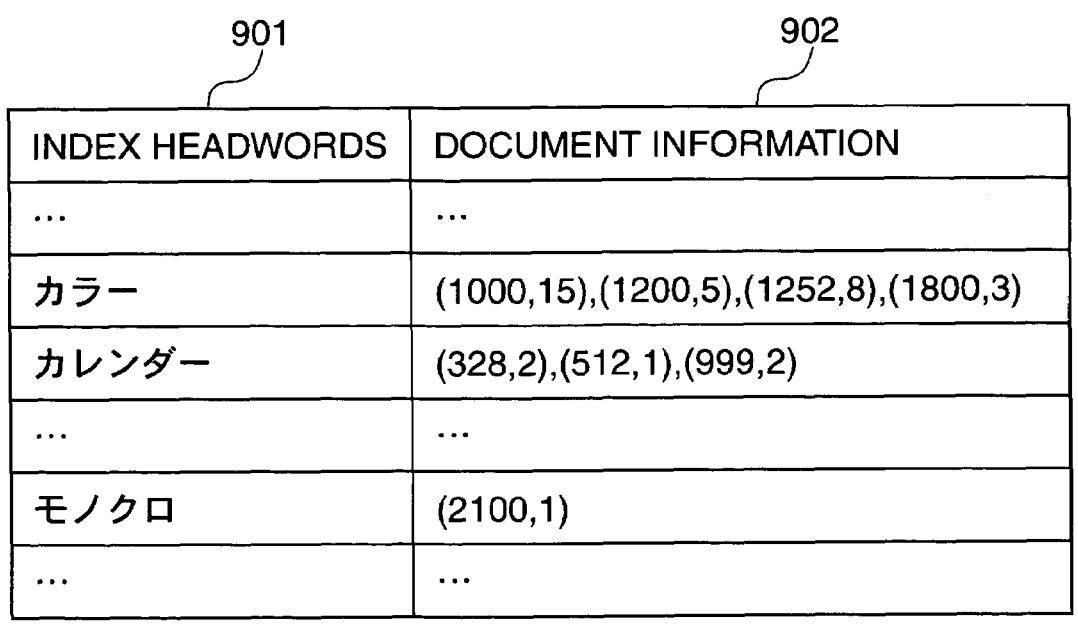
FIG. 9 is a schematic diagram showing the structure of a word index.

FIG. 9 is a schematic diagram showing the structure of the word index 205. The word index 205 is a table storing, for all of the words that appear in the registered documents, correspondence between the documents in which the words appear and the appearance frequency in the respective documents. First column information 901 in the table of the word index 205 includes words (index headwords) that are search headwords. Second column information 902 in the table is document information that associates documents in which the index headwords 901 appear and the number of times the respective index headwords 901 appear in the respective documents, and is stored for all documents in which the respective index headwords 901 appear. In the second column information, documents are recorded using document identification numbers that are uniquely assigned.

For example, corresponding to the word "カラー" ("color") in the index headwords 901, (1000, 15), (1200, 5) and so forth are recorded in the document information 902, showing that the word "カラー" appears fifteen times in the document with a document identification number "1000" and five times in the document with a document identification number "1200".

Figure 10:
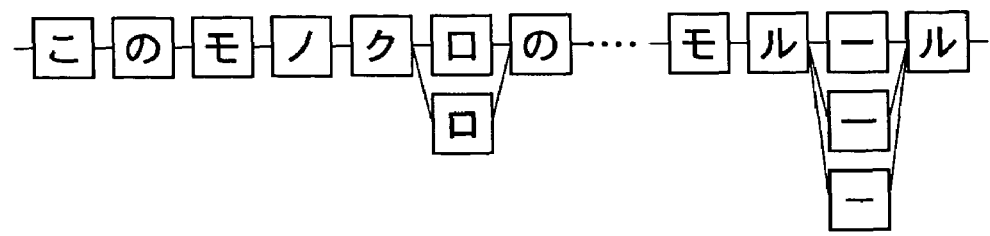
FIG. 10 is a schematic diagram showing the structure of a character candidate lattice used in the character correction process.

FIG. 10 is a schematic diagram showing the structure of a character candidate lattice used in the character correction process.

The character candidate lattice is an arrangement, in lattice format, of candidate characters for characters that have the possibility of being misrecognized and is produced in the character correction process by the character correction processing section 209. When any of the characters in the extracted text subjected to the character correction process matches one of characters stored in the character correction dictionary 210 in FIG. 7, other characters corresponding to such character are added as replacement candidate characters.

In FIG. 10, part of a character candidate lattice generated for the extracted text that is the character recognition result shown in FIG. 5 is illustrated. For the character string "このモノクロの写真に写っているモルールは当時の重要な交通手段であった" ("モルール appearing in the monochrome picture was an important traffic means in those days"), a lattice is generated to which candidate characters have been added for the characters "ロ" and "━━━" appearing in the character correction dictionary 210 shown in FIG. 7.

Figure 11:
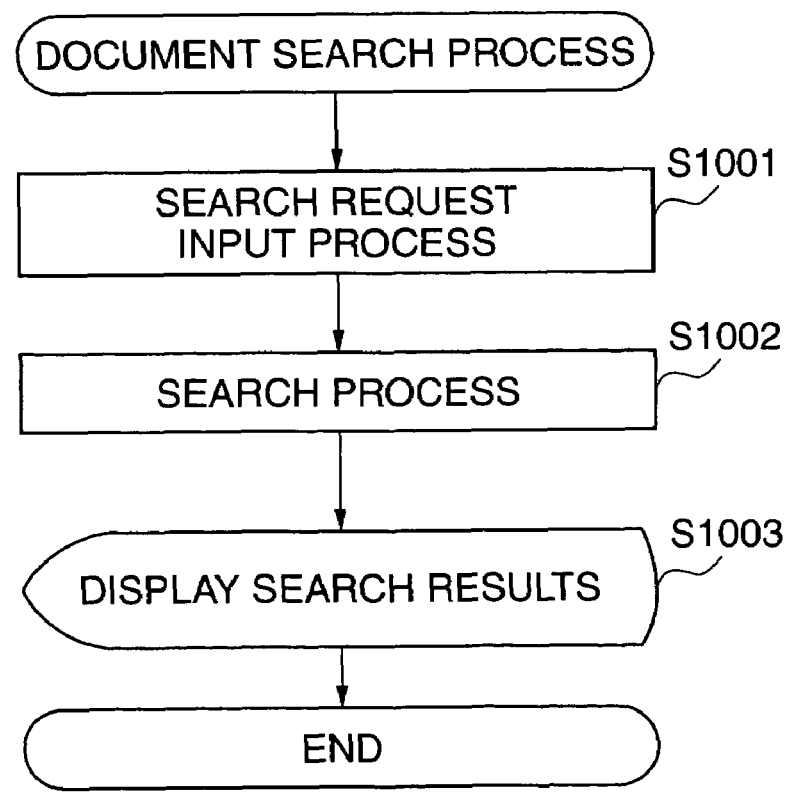
FIG. 11 is a flowchart showing the procedure of a document search process according to the present embodiment.

FIG. 11 is a flowchart showing the procedure of the document search process according to the present embodiment.

First, in a step S1001, a processing module that carries out the operation of the search request input processing section 201 carries out the search request input process. In the search request input process, the search information (a search keyword in the present embodiment) inputted to the search phrase input region 302 in the operation panel shown in FIG. 3 is fetched, a word is extracted from the input search information by referring to the word extraction dictionary 207, and the extracted search word is stored in the search keyword storing section 202.

Next, in a step S1002, documents that include the search keyword stored in the search keyword storing section 202 are searched by referring to the word index 205. That is, the search keyword is fetched from the search keyword storing section 202, a search is performed for index headwords 901 that match the fetched search keyword, and the document information 902 that corresponds to the matching index headwords 901 are fetched. Then, the document identification number and the appearance frequency in the fetched document information 902 are stored in the search result storing section 204. It should be noted that when document information with the same document identification number has already been stored in the search result storing section 204, the appearance frequency in the same document information is updated. The above process is carried out for every search keyword stored in the search keyword storing section 202, and when the process has been completed, the search results stored in the search keyword storing section 202 are sorted into descending order of appearance frequency.

Next, in a step S1003, the search results found in the step S1002 are fetched from the search result storing section 204 and displayed. It should be noted that this process is carried out in the same way as a known process widely used in similar information searching apparatuses. After this, the present process is terminated.

Figure 12:
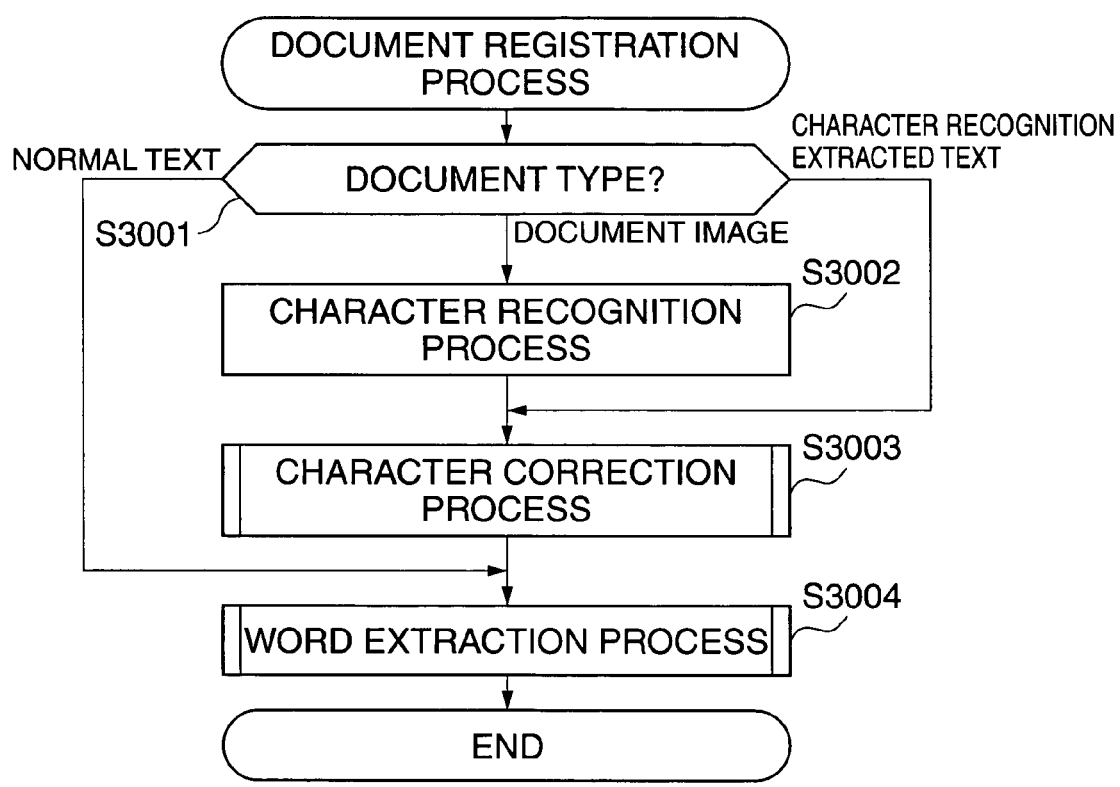
FIG. 12 is a flowchart showing the procedure of a document registration process according to the present embodiment.

FIG. 12 is a flowchart showing the procedure of the document registration process according to the present embodiment.

First, in a step S3001, the document type of the document inputted to the document registration processing section 215 is determined. This determination of document type is carried out using the filename extension of the document inputted to the document registration processing section 215, and when the extension is "bmp", "jpg", "gif", "tif" or the like, the document type is determined to be "document image", therefore an indication of "document image" is stored in the document type storing section 214, and the process proceeds to a step S3002. When the extension is "ocr", the document type is determined to be an extracted text obtained as a result of the character recognition process, therefore an indication of "character recognition extracted text type" is stored in the document type storing section 214, the contents of the document is stored in the extracted text 212, and the process proceeds to a step S3003. On the other hand, when the extension is "txt", "html", or the like, the document is determined to be a normal text, therefore an indication of "text type" is stored in the document type storing section 214, and the process proceeds to a step S3004.

In the step S3002, the character recognition process is carried out on character parts of the image in the document which is determined to be the "image type". In this case, since the document type is changed from "image type" to "character recognition extracted text type", extracted text of the recognized characters is generated in the extracted text 212, an indication of "character recognition extracted text type" is stored in the document type storing section 214, and the process proceeds to the step S3003. It should be noted that the character recognition process that compares image information with character images and carries out a conversion to character codes is performed according to a known method.

In the step S3003, to correct character recognition errors in the extracted text 212, the character correction process shown in FIG. 13, described later, is carried out. Here, the character correction process is carried out on a recognized character extracted text obtained as a result of the character recognition process in the step S3002 or for an extracted text that is a document determined as the "character recognition extracted text type" in the step S3001.

Next, in the step S3004, a word extraction process shown in FIG. 14, described later, is carried out. That is, words are extracted from a normal document (normal text) that is not the result of character recognition or a document (character recognition extracted text) on which the character correction process in the step S3003 has been carried out, and a word index 205 for document searches is generated.

Figure 13:
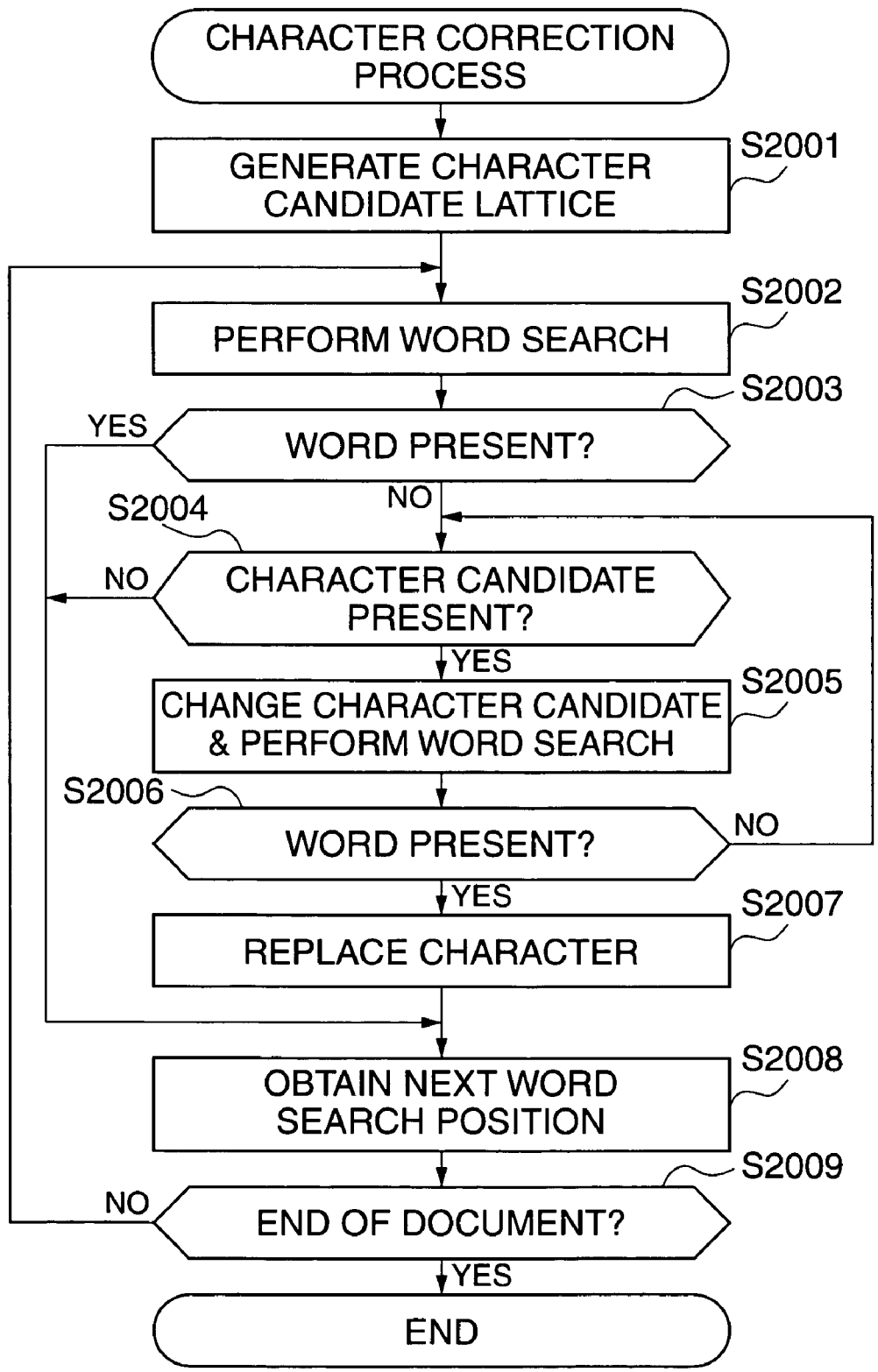
FIG. 13 is a flowchart showing the procedure of a character correction process carried out in a step S3003 in FIG. 12.

FIG. 13 is a flowchart showing the procedure of the character correction process carried out in the step S3003 in FIG. 12.

First, in a step S2001, a character candidate lattice used in the document correction process is generated. As mentioned above, this character candidate lattice has a lattice structure in which candidate characters are added to characters that are susceptible to misrecognition out of the extracted text resulting from the character recognition process (see FIG. 10). In this character candidate lattice generation process, a character is fetched from the extracted text 212 being processed, reference is made to the character correction dictionary 210, and when the fetched character has been registered in the character correction dictionary 210, characters in a group of similarly shaped characters that include the fetched character are added to the character candidate lattice as candidate characters. At this time, the character in the original extracted text is placed as a first character in the candidate characters at a lattice point in the lattice.

Next, in a step S2002, the word extraction dictionary 207 is searched in accordance with the first character of the lattice point in the character candidate lattice. That is, a search is performed to check whether or not there is a headword that matches a character string comprised of the first character at the lattice point in the lattice.

Next, in a step S2003, it is determined whether or not a matching word has been found as a result of the word search in the step 2002. If a matching word has been found, the process proceeds to a step S2008, but when no matching word has been found, the process proceeds to a step S2004.

In the step S2004, it is determined whether or not there is a candidate character string in the character candidate lattice for which a word search has not been carried out. When there is no candidate character string for which a word search has not been carried out, the process proceeds to the step S2008, but when there is a candidate character string for which a word search has not been carried out, the process proceeds to a step S2005.

In the step S2005, the candidate character is changed, and a word search is carried out for a candidate character string including the new candidate character for which a search has not been carried out. Next, in a step S2006, it is determined whether or not a matching word has been found as a result of the word search in the step S2005, and when no matching word has been found, the process returns again to the step S2004, and the determination of whether or not there is a candidate character string for which a word search has not been carried out is repeated.

On the other hand, when a word has been found, the process proceeds to a step S2007 where the characters in the extracted text are replaced with characters composing the candidate character string that matches the word found in the step S2005. For example, when the word extraction dictionary 207 shown in FIG. 8 has been searched for the character candidate lattice shown in FIG. 10, the candidate character string "モノクロ" in the headword 801 matches a word "モノクロ" in the character candidate lattice, so that the kanji character "口" in the extracted text "モノク口" is replaced with the katakana character "ロ".

Next, in the step S2008, the next word search position is obtained. That is, character candidate strings for which comparison with the word extraction dictionary 207 has been completed are skipped, and a start position of a candidate character string that is yet to be compared is obtained. Here, in the case where the process has reached the step S2008 by branching from the step S2004, a matching word could not be found for any candidate character string in the character candidate lattice, so that a position after a first postposition (which is unique to the Japanese language and functions as an auxiliary to a main word) following the last character position for which a matching word was found is set as the start position of the next candidate character string.

Next, in a step S2009, it is determined whether or not the start position of the next candidate character string obtained in the step S2008 has reached the end of the document, that is, whether or not the character correction process that compares strings with the word extraction dictionary 207 has been completed for all the character strings in the extracted text. When the end of the document has not been reached, the process returns to the step S2002, whereafter the process is repeated for an unprocessed character string. On the other hand, when the end of the document has been reached, the present process is terminated.

Figure 14:
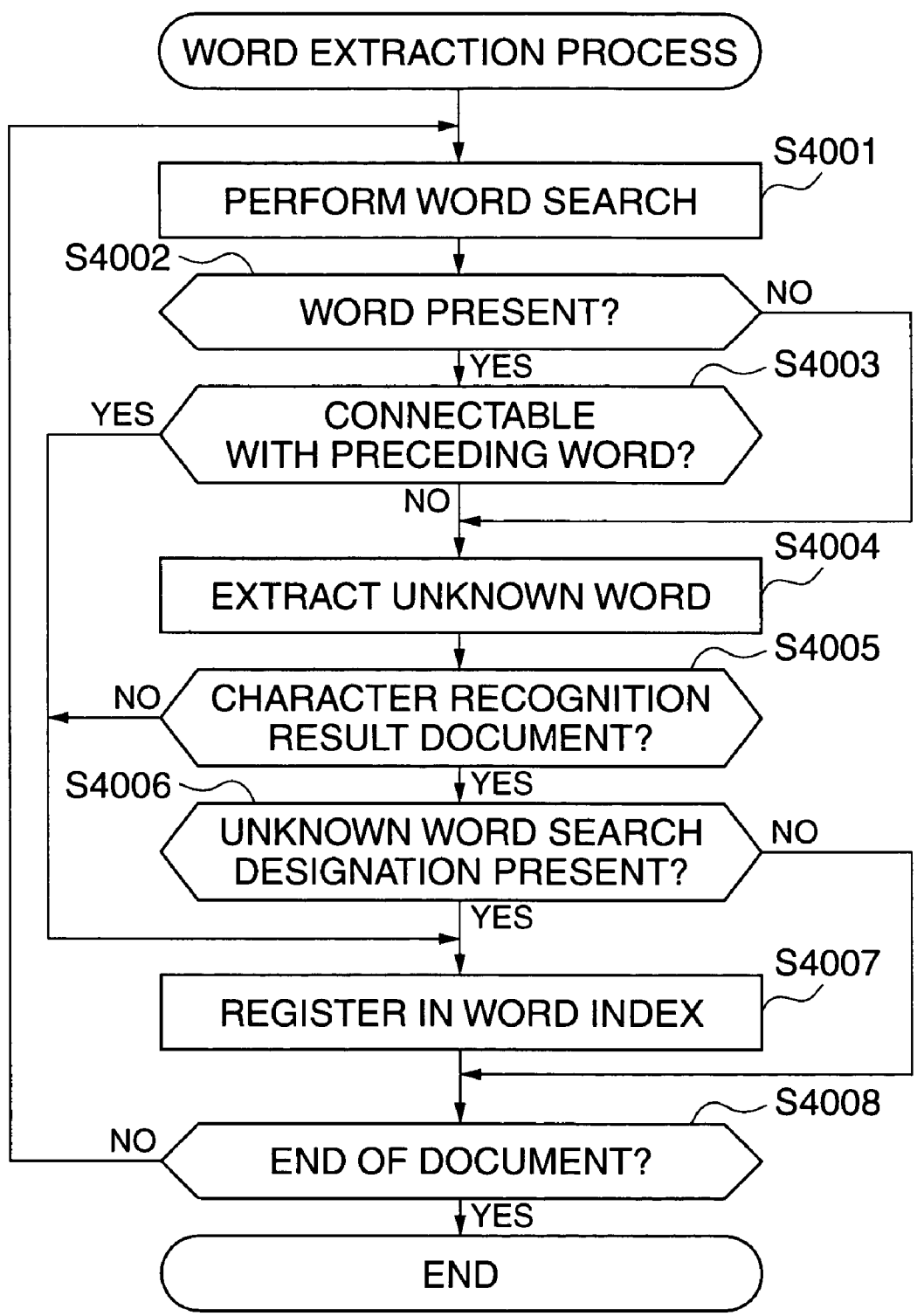
FIG. 14 is a flowchart showing the procedure of a word extraction process carried out in a step S3004 in FIG. 12.

FIG. 14 is a flowchart showing the procedure of the word extraction process executed in the step S3004 in FIG. 12.

First, in a step S4001, a word search, that is, comparison of character strings in the text subjected to the word extraction process with the word extraction dictionary 207 is carried out. Next, in a step S4002, it is determined whether or not a matching word has been found. If as a result of this determination, no matching word has been found, the process proceeds to a step S4004, while if a matching word has been found, the process proceeds to a step S4003.

Next, in the step S4003, it is determined whether or not the found word can be joined with an immediately preceding word that has already been extracted, using a connection determination table, not shown, and based on part-of-speech information in the word extraction dictionary 207. The method for determining connectability with the immediately preceding word and the structure of the connection determination table used for the connectability determination are known, and description thereof is, therefore, omitted.

If as a result of this determination, the extracted word and the word found by the search can be connected, the process proceeds to a step S4007, while if the words cannot be connected, the process proceeds to the step S4004.

The step S4004 is carried out when as the result of the word search in the step S4001, no matching word has been found or the found matching word cannot be connected to the immediately preceding word. In the step S4004, an extraction process for extracting an unknown word that is not registered in the word extraction dictionary 207 is carried out starting with the comparison start position of the search.

The extraction process for an unknown word can be carried out using a known method such as a method that extracts consecutive katakana letters as one unknown word or extracts characters between a character at the comparison start position and a character immediately preceding a high-frequency postposition as one unknown word. For example, by applying this unknown word extraction method to the text shown in FIG. 6 that has been subjected to the character correction process, it is possible to extract, as an unknown word, "モルール" which is unregistered in the word extraction dictionary 207 shown in FIG. 8. It should be noted that as mentioned above, "モルール" in FIG. 6 is a string of misrecognized characters that should actually be "モノレール".

Next, in a step S4005, it is determined whether or not the document being subjected to the word extraction process is a character recognition result document, that is, whether or not the document is a character recognition processed document. This determination as to whether or not the document is a character recognition result document is carried out by referring to the document type stored in the document type storing section 214. For example, in the step S3001 or the step S3002, if the document is stored as "character recognition extracted text type" in the document type storing section 214, the document is determined to be a character recognition result document.

If as a result of this determination, the document being subjected to the word extraction process is not a character recognition result document (character recognition processed document), the process proceeds to the step S4007, while if the document being subjected to the word extraction process is a character recognition result document (character recognition processed document), the process proceeds to a step S4006, where it is determined whether or not there is an unknown word search designation for the character recognition result document. This determination as to whether there is an unknown word search designation is carried out by referring to the unknown word search designating/storing section 208. Here, "there is unknown word search designation" means that an unknown word extracted from the character recognition processed document is permitted to be registered in the word index 205 as index information, and "there is no unknown word search designation" means that such registration is inhibited.

If the result of the determination is "there is unknown word search designation", the process proceeds to the step S4007.

In the step S4007, the word (known word) found in the step S4001, or the unknown word extracted in the step S4004 is registered in the word index 205 as index information. At this time, in the case where the word to be registered is already present in the index headwords 901 of the word index 205, when a document identification number of the document is present in the document information 902 corresponding to the index headwords 901, a value of 1 is added to the appearance frequency corresponding to the document identification number. Also, in the case where the word to be registered is already present in the index headwords 901 of the word index 205, when the document identification number of the document is not present in the document information 902 corresponding to the index headwords 901, the document identification number of the extracted text is newly registered and the appearance frequency is set to 1. After this, the process proceeds to a step S4008.

On the other hand, if the determination result of the step S4006 is "there is no unknown word search designation", the extracted unknown word is not registered in the word index 205 as index information, and the process proceeds to the step S4008.

In the step S4008, it is determined whether or not the process has been completed for all the character strings in the document (text) being subjected to the word extraction process, that is, whether or not the end of the document has been reached. If the result of this determination is that the end of the document has been reached, the process returns to the step S4001 to repeat the above process for an unprocessed character string. Conversely, if the end of the document has not been reached, the present process is terminated.

According to the present embodiment, as described above, whether unknown words extracted from a character recognition processed document are to be registered in the word index 205 as index information can be designated using the unknown word search designating/storing section 208. As a result, whether unknown words are to be registered in an index can be decided in accordance with user wishes as to whether emphasis is to be placed on suppressing missed search hits or improving search accuracy, and therefore appropriate searches with few missed search hits and few erroneous hits can be achieved in an easy-to-use manner.

Further, in the case where the document is not a character recognition processed document, the registration of words extracted from the document as index information is always permitted. As a result, a high-speed index registration process can be realized.

Moreover, in carrying out the word extraction process for a document that has been subjected to the character recognition process, the character correction process is carried out in advance. As a result, the accuracy of information searches can be improved.

In the present embodiment, unknown words extracted from a character recognition processed document are registered in the word index 205 as index information only in the case of "there is unknown word search designation" (the steps S4006, S4007). However, it should be noted that the present invention is not limited to this, and the information searching apparatus may be constructed so as to inhibit the registration of all unknown words extracted from a character recognition processed document in the word index 205 as index information. In this case, the processing in the step S4006 in FIG. 14 is omitted and when the result of the determination in the step S4005 is that the document being subjected to the word extraction process is a character recognition result document (character recognition processed document) the process may proceed directly to the step S4008.

By this alternative construction, whether registration in the word index 205 as index information is permitted or inhibited is determined according to the type of document from which words are extracted. As a result, for example, it is possible to suppress wasteful and inappropriate registration of an unknown word extracted from a character recognition processed document as an index, resulting in a shortened time period required by the index registration process and in a reduced index size. Further, even for a document that contains character recognition errors, the registration of inappropriate character strings as an index due to recognition errors can be avoided to thereby suppress inappropriate search results, and hence make it possible to achieve information searches with superior operability and high accuracy. On the other hand, for a document that does not contain character recognition errors, words extracted from such document can be all registered to thereby realize a high-speed index registration process. By thus determining whether unknown words are to be registered as an index in accordance with the type of document, it is possible to carry out appropriate searches with few missed search hits and few erroneous search hits.

Although in the present embodiment the word index 205, the word extraction dictionary 207, and the character correction dictionary 210 are described as being arranged in the DISK 14 implemented by a single apparatus, these component elements may be arranged in respective different apparatuses and processing may be carried out on a network via the NIC 19.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read out from the storage medium realizes the functions of the embodiment described above, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD–RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium, into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An information searching apparatus comprising:
   an index information registering device that registers a word extracted from a document in association with the document as index information for document search;
   a document searching device that searches a document corresponding to information relating to a requested search by referring to the index information registered by said index information registering device;
   an unknown word extracting device that extracts an unknown word which is not in a dictionary from the document being searched;
   a document type determining device that determines whether a type of the document being searched is a character recognition processed document that has been processed through a character recognition device;
   a permitting/inhibiting designating device that designate whether said index information registering device is permitted or inhibited to register as the index information the unknown word extracted by said unknown word extracting device from the document being searched when the document being searched is the character recognition processed document; and
   a registration permitting/inhibiting deciding device that decides, when the type of the document being searched is the character recognition processed document, to inhibit said index information registering device from registering as the index information the unknown word extracted from the document being searched by said unknown word extracting device if said permitting/inhibiting designating device designates to inhibit said index information registering device from registering.

2. An information searching apparatus according to claim 1, wherein
   said registration permitting/inhibiting deciding device permits said index information registering device to register as the index information the unknown word extracted from the document being searched by said unknown word extracting device when the type of document is not the character recognition processed document.

3. An information searching apparatus according to claim 1,
   further comprising a character correcting device that corrects an error in the character codes included in the document being searched when the type of the document being searched is the character recognition processed document,
   wherein said unknown word extracting device extracts the unknown word from the document having the error corrected by said character correcting device.

4. An information searching apparatus according to claim 3, wherein said character correcting device refers to a character correction dictionary, in which characters having similar character patterns are stored in association with each other, and a word dictionary for comparing character strings, and corrects the error by changing an associated character code included in the character recognition processed document to a character composing a character candidate string, out of character candidate strings produced by adding at least one character pattern in the character correction dictionary to at least one character code included in the character recognition processed document, and matching a word included in the word dictionary.

5. An information searching apparatus according to claim 1, wherein:
   said document type determining device determines whether the type of the document being searched is an image document;
   the information searching apparatus further comprises:
   the character recognition device, which obtains character codes from the image document when the type of the document being searched is an image document; and
   a character correcting device that corrects an error in the character codes included in the document processed by said character recognition device,
   wherein said unknown word extracting device extracts the unknown word from the document being searched after correction of the document by said character correcting device.

6. An information searching apparatus according to claim 1, wherein said document type determining device determines the type of the document being searched, based on at least one of a filename extension of the document being searched and attribute information added in advance to the document being searched.

7. An information searching method comprising:
   an index information registering step of registering a word extracted from a document in association with the document as index information for document search;
   a document search step of searching a document corresponding to information relating to a requested search by referring to the index information registered in said index information registering step;
   an unknown word extracting step of extracting an unknown word which is not in a dictionary from the document being searched;
   a document type determining step of determining whether a type of the document being searched is a character recognition processed document that has been processed through a character recognition device;
   a permitting/inhibiting designating step of designating whether said index information registering step is permitted or inhibited to register as the index information the unknown word extracted in said unknown word extracting step from the document being searched when the document being searched is the character recognition processed document; and a registration permitting/inhibiting deciding step of deciding, when the type of the document being searched is the character recognition processed document, to inhibit in said index information registering step to register as the index information the unknown word extracted from the document being searched in said unknown word extracting step if said permitting/inhibiting designating step designates to inhibit registering in said index information registering step.

8. A computer-readable storage medium storing a computer-executable information searching program comprising:

an index information registering module for registering a word extracted from a document in association with the document as index information for document search;

a document search module for searching a document corresponding to information relating to a requested search by referring to the index information registered by said index information registering module;

an unknown word extracting module for extracting an unknown word which is not in a dictionary from the document being searched;

a document type determining module for determining whether a type of the document being searched is a character recognition processed document that has been processed through a character recognition device;

a permitting/inhibiting designating module for designating whether said index information registering module is permitted or inhibited to register as the index information the unknown word extracted in said unknown word extracting step from the document being searched when the document being searched is the character recognition processed document; and a registration permitting/inhibiting deciding module for deciding, when the type of the document being searched is the character recognition processed document, to inhibit said index information registering module from registering as the index information the unknown word extracted from the document being searched by said unknown word extracting module if said permitting/inhibiting designating module designates to inhibit registering in said index information registering module.

* * * * *